(12) United States Patent
Horikawa et al.

(10) Patent No.: US 8,181,756 B2
(45) Date of Patent: May 22, 2012

(54) SHOCK ABSORBER

(75) Inventors: Akiyoshi Horikawa, Tokyo (JP); Yuta Ohmura, Tokyo (JP)

(73) Assignee: Koganei Corporation, Tokyo (JP)

( * ) Notice: Subject to any disclaimer, the term of this patent is extended or adjusted under 35 U.S.C. 154(b) by 1259 days.

(21) Appl. No.: 11/712,663

(22) Filed: Mar. 1, 2007

(65) Prior Publication Data

US 2007/0205064 A1    Sep. 6, 2007

(30) Foreign Application Priority Data

Mar. 2, 2006  (JP) .................................. 2006-056030
Feb. 26, 2007 (JP) .................................. 2007-045771

(51) Int. Cl.
*F16F 9/18*    (2006.01)
(52) U.S. Cl. ........................ 188/312; 188/316; 188/281
(58) Field of Classification Search ................... 188/316, 188/281, 312; 267/226
See application file for complete search history.

(56) References Cited

U.S. PATENT DOCUMENTS

| | | | |
|---|---|---|---|
| 2,905,458 A | 9/1959 | Mason | |
| 2,948,358 A | 8/1960 | Born et al. | |
| 3,889,934 A | 6/1975 | Kamman | |
| 4,133,086 A | 1/1979 | Brennan | |
| 4,711,463 A | 12/1987 | Knable et al. | |
| 5,159,997 A * | 11/1992 | Heideman et al. | 188/282.1 |
| 5,228,640 A | 7/1993 | Mouille | |
| 5,309,817 A | 5/1994 | Sims | |
| 5,711,514 A | 1/1998 | Lu | |
| 5,749,596 A * | 5/1998 | Jensen et al. | 280/124.166 |
| 5,904,099 A * | 5/1999 | Danneker | 104/53 |
| 5,927,448 A * | 7/1999 | Yamazaki | 188/281 |
| 6,260,832 B1 | 7/2001 | Vignocchi et al. | |
| 6,315,093 B1 | 11/2001 | Miura et al. | |
| 6,722,678 B2 | 4/2004 | McAndrews | |
| 7,076,834 B2 * | 7/2006 | Li | 16/85 |
| 7,410,154 B2 * | 8/2008 | Lam et al. | 267/226 |

FOREIGN PATENT DOCUMENTS

EP    1 118 775 A2    7/2001
(Continued)

OTHER PUBLICATIONS

Korean Office Action dated Jan. 10, 2008.
(Continued)

*Primary Examiner* — Bradley King
(74) *Attorney, Agent, or Firm* — McCormick, Paulding & Huber LLP

(57) ABSTRACT

A shock absorber is attached coaxially with a reciprocating rod driven by a reciprocating unit to prevent a bending moment from being applied to the reciprocating rod in absorbing an impact force. The shock absorber has a hollow rod and an outer cylindrical body mounted axially movably relatively to and outside the hollow rod. An accommodating space is formed between the hollow rod and the outer cylindrical body. A spring force in a direction of being relatively directed to one end portion side of the hollow rod is applied by a compression spring to the outer cylindrical body. The hollow rod is provided with an annular piston which partitions the accommodating space into two liquid chambers. When an impact force in a direction of being relatively directed to the other end side of the hollow rod is applied to the outer cylindrical body, liquid flows from one of the liquid chambers to the other through a gap, so that a resistance force is applied to the annular piston.

8 Claims, 5 Drawing Sheets

FOREIGN PATENT DOCUMENTS

| | | |
|---|---|---|
| EP | 1 375 957 A1 | 1/2004 |
| EP | 1 593 874 A1 | 11/2005 |
| JP | 59-84610 A | 5/1984 |
| JP | 61-55530 | 4/1986 |
| JP | 01-141245 A | 6/1989 |
| JP | H02-47448 U | 3/1990 |
| JP | 2125118 A | 5/1990 |
| JP | 5-229454 | 9/1993 |
| JP | 6-002450 | 1/1994 |
| JP | 08215475 A * | 8/1996 |
| KR | 20-0303161 | 2/2003 |

OTHER PUBLICATIONS

European Search Report for Application EP 07 10 3298 dated Aug. 30, 2007.

Search Report from European Application No. 07103294.0 dated Jul. 16, 2007 (7 pages).

An Office Action from corresponding Japanese Appln. No. 2007-045771 dated Jul. 15, 2011 with English translation (4 pages).

* cited by examiner

SHOCK ABSORBER

CROSS-REFERENCE TO RELATED APPLICATIONS

Applicant hereby claims foreign priority benefits under U.S.C. §119 from Japanese Patent Applications No. 2006-56030 filed on Mar. 2, 2006 and No. 2007-45771 filed on Feb. 26, 2007, the respective contents of which are incorporated by reference herein.

TECHNICAL FIELD OF THE INVENTION

The present invention relates to a shock absorber for decreasing an impact force of a moving member in stopping the moving member.

BACKGROUND OF THE INVENTION

In a fluid pressure cylinder which drives a reciprocating rod, that is, a piston rod by hydraulic pressure or pneumatic pressure, when the reciprocating rod is stopped at a stroke end of the reciprocating rod, an impact force is applied to the reciprocating rod and a moving member such as a member to be driven by the reciprocating rod. To decrease the impact force, a buffer such as a resin-made damper, air cushion, hydraulic cushion, shock absorber is used so that the moving member collides with a member on a fixing side through the buffer.

For example, when an electronic component or jig is carried with a reciprocating rod of a pneumatic cylinder, unless any buffer is provided to the pneumatic cylinder, a product to be carried such as the electronic component, namely, a member to be driven receives the impact force at the stroke end of the reciprocating rod. As a result, not only the product to be carried is moved to an unexpected place or damaged or dropped but also a large vibration occurs, thereby shortening a lifetime of the pneumatic cylinder or an electronic-component manufacturing apparatus including the same. To decrease such an impact force at the stroke end, the aforementioned buffer is provided to the pneumatic cylinder. If carrying speed is reduced without providing the buffer in order to prevent the product to be carried from dropping, an operating ratio of the electronic-component manufacturing apparatus drops. If a member for securely fixing the product to be carried to the moving member is used, an entire structure of the apparatus is made large.

The shock absorber as a buffer is often used to stop the product to be carried moving at high speed or to stop movement of a heavy product to be carried. The shock absorber includes one of a type of making a rod protrude from an end portion of a cylindrical case (see Patent Document 1: Japanese Utility Model Laid-Open Publication No. 61-55530).

To use the shock absorber of such a type to absorb the impact force at the stroke end of the reciprocating rod driven by the pneumatic cylinder, the shock absorber is attached to a side face of a cylinder main body while a stopper with which the rod of the shock absorber collides is attached to the reciprocating rod.

FIG. 10 is a perspective view showing a conventional slide table type pneumatic cylinder, which includes a cylinder main body 1 and a reciprocating table 3 mounted reciprocably to a guide rail 2 provided to the body. As shown in FIG. 10, in a pneumatic cylinder in which a reciprocating rod 4 provided to the cylinder main body 1 is connected to the reciprocating table 3 through a linking member 3a so as to drive the reciprocating table 3 by the reciprocating rod 4, shock absorbers 5a and 5b are attached to the cylinder main body 1 through brackets 6a and 6b in order to absorb the impact force at the stroke end of the reciprocating rod 4 or reciprocating table 3, and a stopper 8 with which the rods 7a and 7b of the shock absorbers 5a and 5b collide is attached to the reciprocating table 3.

Also, if the shock absorbers 5a and 5b are attached to the reciprocating table 3, the stopper with which the rods 7a and 7b of the shock absorbers 5a and 5b collide is to be attached to the cylinder main body 1. In any case, the rods 7a and 7b absorb the impact force of the reciprocating table 3 while moving and retracting into cylindrical cases of the shock absorbers 5a and 5b.

In the shock absorber of such a type, the cylindrical case is filled with fluid such as silicone oil, and a spring or the like for returning, to an original position, the rod moved and retracted at a time of collision is incorporated in the cylindrical case.

SUMMARY OF THE INVENTION

In the case where a conventional shock absorber is used to absorb the impact force of the reciprocating unit such as the pneumatic cylinder, even if the shock absorber is attached to the cylinder main body or to the reciprocating table in an above-mentioned manner, the shock absorber is attached apart from an axial center of the cylinder main body. For this reason, the shock absorber has been attached at a position protruding from a side face or upper face of the reciprocating table or at a side face of the pneumatic cylinder.

Thus, since the shock absorber absorbs the impact force at a position offset from the axial center of the pneumatic cylinder, a bending moment is applied to the reciprocating table and the reciprocating rod in absorbing the impact force and so the bending moment is applied also to a guide rail which supports the reciprocating table. Accordingly, strength of the cylinder main body, reciprocating table and guide rail needs to be increased.

As shown in FIG. 10, if the shock absorbers 5a and 5b are attached to the cylinder main body 1, the stopper 8 which collides with the rods 7a and 7b needs to be attached to the reciprocating table 3. If the shock absorbers 5a and 5b are attached to the reciprocating table 3, the stopper 8 which collides with the rods 7a and 7b needs to be attached to the cylinder main body 1. Thus, the number of parts constituting the pneumatic cylinder increases and concurrently a size of the apparatus is made large. Further, if the stopper is attached to the reciprocating rod and the shock absorber is attached to an outer face of the cylinder main body, a rotation stopper for the reciprocating rod needs to be provided to the cylinder main body so that the reciprocating rod collides with the rods of the shock absorber.

Meanwhile, in order to dispose the shock absorber coaxially with the reciprocating rod so that no bending moment is applied to the reciprocating rod of the pneumatic cylinder at a time of absorbing the impact force, it is necessary to attach a fixing jig such as a bracket to the cylinder main body and attach the shock absorber to the cylinder main body through the fixing jig. Therefore, since the fixing jig protrudes from a periphery of the cylinder main body, space efficiency in the cylinder main body is bad.

An object of the present invention is to attach a shock absorber coaxially to a reciprocating rod driven by a reciprocating unit such as a pneumatic cylinder so as to apply no bending moment to the reciprocating rod in absorbing an impact force.

Another object of the present invention is to directly attach the shock absorber to the reciprocating rod to eliminate a fixing jig for attaching the shock absorber or a stopper which collides with the shock absorber, thereby reducing a manufacture cost of the reciprocating unit.

Still another object of the present invention is to directly attach the shock absorber to the reciprocating rod to save a space on a periphery of the reciprocating unit.

Yet still another object of the present invention is to be capable of adjusting a stroke of the reciprocating rod by adjusting an axial attaching position of the shock absorber with respect to the reciprocating rod.

A shock absorber according to the present invention decreases an impact force of a reciprocating rod provided in a reciprocating unit at a time of stopping the reciprocating rod, the shock absorber comprising: a hollow rod having an attaching hole formed therein and being attached coaxially with the reciprocating rod; an outer cylindrical body mounted outside the hollow rod and axially movably relatively to and coaxially with the hollow rod; an annular piston provided outside the hollow rod, partitioning a space formed between the hollow rod and the outer cylindrical body for accommodating liquid into a first liquid chamber and a second liquid chamber, and applying a resistance force to a flow of the liquid from the first liquid chamber to the second liquid chamber at a time of an impact-force absorption movement of the hollow rod to the outer cylindrical body; and a restoring means provided in the first liquid chamber and returning the hollow rod to an original position located before an impact-force absorption.

The shock absorber according to the present invention further comprises: the annular piston provided integrally outside the hollow rod; and a gap formed between an inner circumferential face of the outer cylindrical body and the annular piston to communicate with the first liquid chamber and the second liquid chamber.

The shock absorber according to the present invention further comprises: a check valve provided in the annular piston to permit the flow of the liquid from the second liquid chamber to the first liquid chamber, and to block the flow of the liquid from the first liquid chamber to the second liquid chamber.

The shock absorber according to the present invention further comprises: the annular piston provided outside the hollow rod so as to be slidable axially with respect to the hollow rod; an outside gap formed between an outer circumferential face of the annular piston and an inner circumferential face of the outer cylindrical body, and applying a resistance force to the flow of the liquid from the first liquid chamber to the second liquid chamber; and an inside gap formed between an inner circumferential face of the annular piston and an outer circumferential face of the hollow rod, and guiding the liquid from the second liquid chamber to the first liquid chamber together with the outside gap, the inside gap being larger in size than the outside gap.

A shock absorber according to the present invention decreases an impact force at a time of stopping a reciprocating rod provided in a reciprocating unit main body, the shock absorber comprising: a hollow rod having an attaching hole formed therein and being attached coaxially with the reciprocating rod; an outer cylindrical body mounted outside the hollow rod so as to be movable axially relatively to and coaxial with the hollow rod; an intermediate cylindrical body formed inside the outer cylindrical body and forming a communicating gap between the outer cylindrical body and the intermediate cylindrical body; an annular piston provided outside the hollow rod so as to be slidable on an inner circumferential face of the intermediate cylindrical body, the annular piston partitioning a liquid accumulating space formed between the hollow rod and the outer cylindrical body into a first liquid chamber and a second liquid chamber; an orifice formed in the intermediate cylindrical body and decreasing a communicating area between the communicating gap and the first liquid chamber in accordance with an impact-force absorption movement of the hollow rod to the outer cylindrical body; and a restoring means provided in the first liquid chamber and restoring the hollow rod to an original position located before an impact-force absorption.

The shock absorber according to the present invention is such that a female screw to be screwed to a male screw formed in the reciprocating rod is formed in the attaching hole.

The shock absorber according to the present invention further comprises: a check valve provided in the annular piston to permit the flow of the liquid from the second liquid chamber to the first liquid chamber, and to block the flow of the liquid from the first liquid chamber to the second liquid chamber.

The shock absorber according to the present invention further comprises: a striker mounted on a colliding end portion of the outer cylindrical body so as to abut on a reciprocating unit main body driving the reciprocating rod.

The shock absorber according to the present invention further comprises: an accumulator incorporated in the second liquid chamber to absorb the liquid.

According to the present invention, the shock absorber is fixed coaxially with the reciprocating rod. Therefore, when the outer cylindrical body collides with the reciprocating unit main body at a stroke end of the reciprocating rod and absorbs the impact force while moving axially relatively to the hollow rod, no bending moment is applied to the reciprocating rod from the shock absorber. As a result, it is unnecessary to enhance rigidity and strength of the reciprocating unit main body such as a pneumatic cylinder and/or those of a member(s) driven by it, and this makes it possible to achieve a reduction in size and weight of the reciprocating unit.

According to the present invention, a member(s) for attaching the shock absorber to the reciprocating unit main body is unnecessary, and the stopper with which the rod of the shock absorber collides is not required to be attached to the reciprocating member. Therefore, the manufacture cost of the reciprocating unit can be reduced and simultaneously a space surrounding the reciprocating unit is efficiently available.

According to the present invention, the female screw is provided to the attaching hole of the hollow rod to screw the hollow rod to the reciprocating rod, so that an axial position of the shock absorber with respect to the reciprocating rod can be adjusted. Consequently, the stroke of the reciprocating rod can be adjusted easily.

The shock absorber of the present invention may be attached to the reciprocating rod of the pneumatic cylinder, which drives the reciprocating rod by pneumatic pressure. In this case, even if the reciprocating rod is rotated, the impact force can be absorbed. Further, in a slide table type pneumatic cylinder including the pneumatic cylinder and the reciprocating table mounted thereon slidably, the shock absorber of the present invention is attached to the reciprocating rod, which is driven by pneumatic pressure and drives the reciprocating table. Therefore, the shock absorber can absorb the impact force applied to the reciprocating table.

DESCRIPTION OF THE PREFERRED EMBODIMENTS

Figure 1:
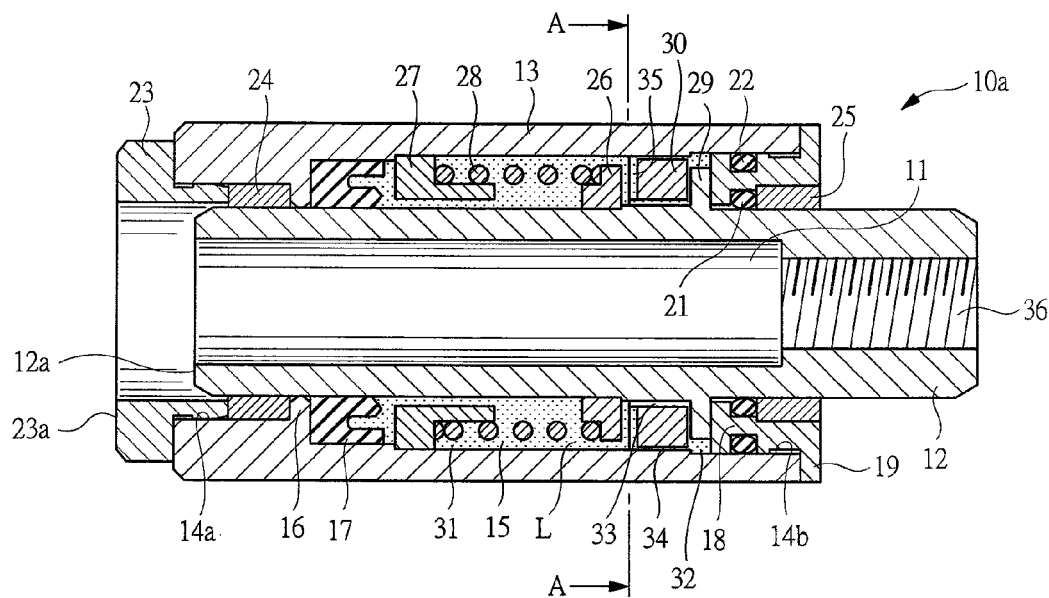
FIG. 1 is a sectional view showing an inoperative condition of a shock absorber according to an embodiment of the present invention.
Figure 2:
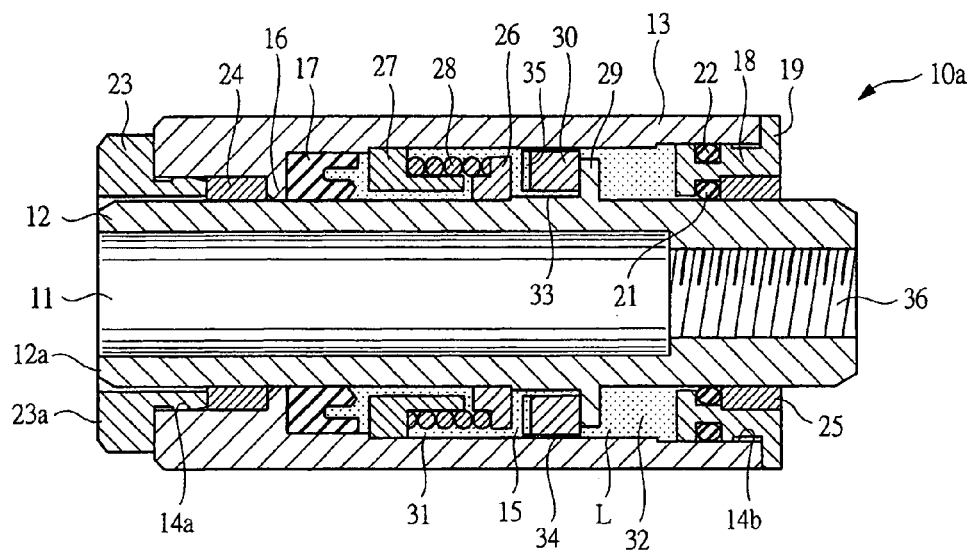
FIG. 2 is a sectional view showing an operative condition of the shock absorber shown in FIG. 1.
Figure 3:
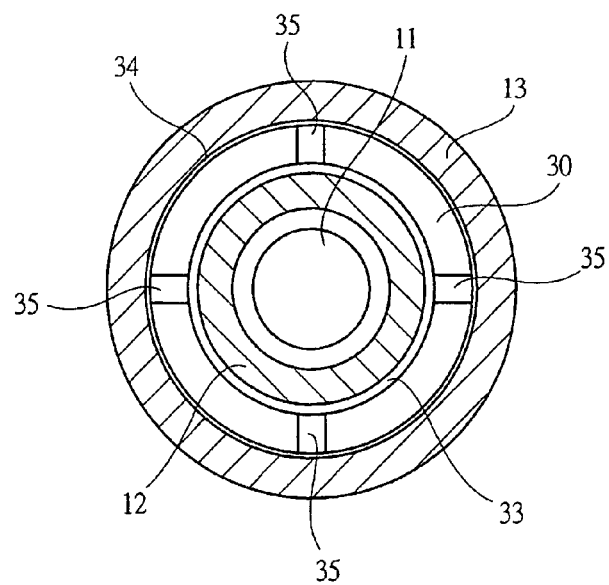
FIG. 3 is a sectional view taken along line A-A in FIG. 1.

Hereinafter, embodiments of the present invention will be described in detail with reference to the accompanying drawings. FIGS. 1 and 2 are sectional views showing a shock absorber according to an embodiment of the present invention. FIG. 1 shows an inoperative condition of the shock absorber, and FIG. 2 shows an operative condition of the shock absorber. FIG. 3 is a sectional view taken along line A-A in FIG. 1.

As shown in FIGS. 1 and 2, this shock absorber 10a includes: a hollow rod 12 at a center of which an attaching hole 11 is formed; and an outer cylindrical body 13 mounted outside the hollow rod 12 so as to be movable axially relatively to the hollow rod 12. Opening portions 14a and 14b are provided in both end portions of the outer cylindrical body 13, and the hollow rod 12 is movable axially relatively to the outer cylindrical body 13 so as to penetrate an interior of the outer cylindrical body 13.

An inner diameter of the outer cylindrical body 13 is larger in some portions than an outer diameter of the hollow rod 12, and an accommodating space 15 for accommodating liquid is formed between an outer circumferential face of the hollow rod 12 and an inner circumferential face of the outer cylindrical body 13 so that silicone oil denoted as liquid L can be accommodated in this accommodating space 15. A stopper 16 is formed at an end portion of the outer cylindrical body 13 integrally with the outer cylindrical body 13 so as to protrude in an inner-radial direction, and a rod packing 17 is incorporated as a sealing material in an inner axial side of the stopper 16 in order to prevent an external leakage of the liquid L between the outer cylindrical body 13 and the hollow rod 12. A ring-like plug 18 is attached in an opening portion 14b located at the other end portion of the outer cylindrical body 13. A flange 19 which abuts on an end face of the outer cylindrical body 13 is provided to this plug 18, and an O-ring 21 for preventing the external leakage of the liquid L between the plug 18 and the hollow rod 12, and an O-ring 22 for preventing the external leakage of the liquid L from between the plug 18 and the outer cylindrical body 13 are incorporated respectively as sealing materials in annular grooves provided in the plug 18.

An annular striker 23 formed of a resin is fixed to the opening portion 14a of the outer cylindrical body 13, and a collar 24 is fitted between the striker 23 and the stopper 16, and a collar 25 is fitted inside the plug 18. Consequently, an outer circumferential face of the hollow rod 12 makes a sliding contact with each inner circumferential face of the collars 24 and 25.

An annular spring receiver 26 is fixed outside the hollow rod 12 so as to abut on a radial-directional step formed on an outer face of the hollow rod 12, and an annular spring receiver 27 as opposed to the spring receiver 26 is fixed inside the outer cylindrical body 13 so as to abut on a radial-directional step formed on an inner face of the outer cylindrical body 13. A compression coil spring 28 serving as a restoring means is incorporated between the spring receivers 26 and 27. A spring force is applied to the outer cylindrical body 13 by the compression coil spring 28 in such a restoration direction as to direct the outer cylindrical body 13 toward an end portion side of the hollow rod 12, that is, a left end portion side in FIGS. 1 and 2. At this time, a spring force is applied to the hollow rod 12 in such a restoration direction as to direct the hollow rod 12 toward the other end portion side of the outer cylindrical body 13, that is, a right end portion side in FIGS. 1 and 2. Thus, the spring forces are applied to the hollow rod 12 and the outer cylindrical body 13 in opposite axial directions to each other.

A stopper 29 is provided to the hollow rod 12 so as to protrude outward from the outer circumferential face thereof, and a position under a relative movement limit in mutual opposite directions of the hollow rod 12 and the outer cylindrical body 13 by the compression coil spring 28 is restricted by abutment on the stopper 29 and the plug 18.

An annular piston 30 is disposed between the stopper 29 and the spring receiver 26, and the accommodating space 15 is partitioned by the annular piston 30 into a first liquid chamber 31 as a spring chamber which accommodates the compression coil spring 28 and a second liquid chamber 32 located on a side of the opening portion 14b of the outer cylindrical body 13. The annular piston 30 is disposed in the accommodating space 15 in a floating state in which the annular piston 30 does not contact with the hollow rod 12 nor contact with the outer cylindrical body 13. Within a stroke of the annular piston 30 with respect to the hollow rod 12 and the outer cylindrical body 13, an inner diameter of the annular piston 30 is set larger than an outer diameter of the hollow rod 12 while an outer diameter of the annular piston 30 is set smaller than an inner diameter of the outer cylindrical body 13. By doing so, an inside gap 33 for guiding the liquid is formed between an inner face of the annular piston 30 and an outer face of the hollow rod 12, and an outside gap 34 for guiding the liquid is formed between an outer face of the annular piston 30 and an inner face of the outer cylindrical body 13. Consequently, the first liquid chamber 31 and the second liquid chamber 32 communicate with each other through the gaps 33 and 34.

A radial dimension of the inside gap 33 is set larger than that of the outside gap 34, so that the gap 33 is made wide while the gap 34 is made narrow. As shown in FIG. 3, a plurality of slits 35 extending radially are formed in an inside end face of the annular piston 30, that is, an end face opposing the spring receiver 26, so that the liquid L flows into the gap 33 through the slits 35 even when the inside end face of the annular piston 30 contacts with the spring receiver 26.

Therefore, when no impact force is applied as an external force to the shock absorber 10a as shown in FIG. 1, that is, when the shock absorber is in an inoperative condition, the outer cylindrical body 13 is moved by a spring force of the compression coil spring 28 toward the left end portion side of the hollow rod 12 up to a movement limit position where the stopper 29 and the plug 18 abut on each other with respect to the hollow rod 12 as shown in FIG. 1. At this time, the hollow rod 12 is moved toward the right end portion side of the outer cylindrical body 13 up to a movement limit position with respect to the outer cylindrical body 13. When the shock absorber 10a becomes in the inoperative condition as described above and the outer cylindrical body 13 is located on the left end portion side of the hollow rod 12, lengths of the hollow rod 12 and the outer cylindrical body 13 are set so that the striker 23 of the outer cylindrical body 13 becomes a projection end portion protruding from the left end portion of the hollow rod 12 and the right end portion of the hollow rod 12 becomes a projection end portion protruding from the right end portion of the outer cylindrical body 13.

In the case as shown in FIGS. 1 and 2, the entire length of the hollow rod 12 is set longer than that of the outer cylindrical body 13 including the striker 23. Under the inoperative condition of the shock absorber 10a, the right end portion of the hollow rod 12 protrudes in an outer axial direction from the right end portion of the outer cylindrical body 13. Under the inoperative condition as shown in FIG. 1, however, the right end face of the hollow rod 12 as shown in FIG. 1 may be located at a position where it substantially coincides with a end face of the flange 19 of the plug 18 or the hollow rod 12 may be set to have such length that the hollow rod 12 is disposed on an inner axial side rather than at the substantially coinciding position.

Meanwhile, a colliding member (not shown) collides with the striker 23 fixed to the outer cylindrical body 13, whereby an external force is applied to bring the shock absorber 10a into an operative condition. When the shock absorber 10a becomes in the operative condition, as shown in FIG. 2, the outer cylindrical body 13 is relatively moved against a spring force and a later-described resistance force toward the right end portion of the hollow rod 12 up to a position where an end face 23a of the striker 23 coincides with an end face 12a of the hollow rod 12. In this process, the annular piston 30 is moved together with the hollow rod 12 in a state of being pushed by a flow of the liquid L abutting on the stopper 29. In this movement process, impact force energy applied to the outer cylindrical body 13 and the hollow rod 12 is absorbed by the spring force and the resistance force as described later. Simultaneously, the liquid L flows from the first liquid chamber 31 to the second liquid chamber 32 through the narrow outside gap 34. The resistance force is applied by the gap 34 to a flow of the liquid L entering the second liquid chamber 32, whereby a resistance force is applied to a relative movement of the outer cylindrical body 13 to the hollow rod 12. Consequently, the impact force transmitted from the outer cylindrical body 13 to the hollow rod 12 due to a collision of the colliding member with the outer cylindrical body 13 is decreased. Also, in this movement process, no gap exists between the annular piston 30 and the stopper 29 because the annular piston 30 is pressed by the flow of the liquid L and tightly contacted to the stopper 29. Therefore, the liquid L does not flow through the inside gap 33 but flows through the narrow outside gap 34.

When the collision of the colliding member with the shock absorber 10a is released, an axial relative position between the outer cylindrical body 13 and the hollow rod 12 is returned by the spring force from the operative condition shown in FIG. 2 to the inoperative condition shown in FIG. 1. In this movement process, the annular piston 30 is moved to a side of the spring receiver 26 by the liquid L flowing from the second liquid chamber 32 to the first liquid chamber 31. Thus, the annular piston 30 leaves the stopper 29, and is pushed by the spring receiver 26 to move toward the right end portion side of the outer cylindrical body 13. At this time, the liquid L flows from the second liquid chamber 32 into the first liquid chamber 31 through the outside gap 34 and the inside gap 33 and slits 35, so that a great resistance force exerted in shifting from the inoperative condition to the operative condition is not applied as a resistance force to the annular piston 30. Therefore, restoration from the operative condition to the inoperative condition as shown in FIG. 1 becomes prompt.

Thus, by forming the gaps 33 and 34 inside and outside the annular piston 30, each of which has a different radial dimension, and by making the annular piston 30 set in a floating condition, the annular piston 30 is allowed to have a difference between the resistance force applied by the liquid L at a time of movement of the annular piston 30 from the inoperative condition to the operative condition and the resistance force at a time of reverse movement to it. However, the annular piston 30 may be fixed to the outer circumferential face of the hollow rod 12 without providing the inside gap 33. In this case, by forming a hole in an axial direction of the annular piston 30 and incorporating a check valve in the hole in the same manner as described in the drawings, there may be any difference between the resistance force applied to the annular piston 30 at the time of movement of the annular piston 30 from the inoperative condition to the operative condition and that at the time of reverse movement to it. Further, it is permissible to make the end force of the compression coil spring 28 abut on the annular piston 30 by mounting the compression coil spring 28 between the spring receiver 27 and the annular piston 30 without providing the spring receiver 26.

As described above, the hollow rod 12 penetrates and is installed within the outer cylindrical body 13. Therefore, when the shock absorber 10a is operated, the hollow rod 12 is moved relatively to the outer cylindrical body 13 until an end face 12a of the hollow rod 12 coincides with an end face 23a of the striker 23, and then the right end portion of the hollow rod 12 is relatively moved to enter the right end portion of the outer cylindrical body 13. As a result, volume of the accommodating space 15 is kept substantially constant even if the axial relative position between the hollow rod 12 and the outer cylindrical body 13 is moved to any position. Thus, the volume of the accommodating space 15 does not change when the hollow rod 12 is moved axially relatively.

A female screw 36 (linking portion) is formed in an attaching hole 11 of the hollow rod 12, and the shock absorber 10a is screwed by the female screw 36 to the reciprocating rod of a pneumatic cylinder or the like passing through the attaching hole 11. In this way, the hollow rod 12 is screwed to the reciprocating rod, thereby being connected to the reciprocating rod. However, the hollow rod 12 may be attached to the reciprocating rod by use of a pin or bolt or the like instead of providing the attaching hole 11 with the female screw 36. Also, the hollow rod 12 may be preferably attached to the reciprocating rod so as to be moved together with the reciprocating rod during its operation, or the attaching hole 11 may be used as a through hole to be fitted loosely to the reciprocating rod. In this case, an attaching member such as a nut is provided at a tip of the reciprocating rod so that the shock absorber is not detached, whereby the hollow rod 12 is moved axially together with the reciprocating rod by the attaching member when the shock absorber is operated.

Figure 4:
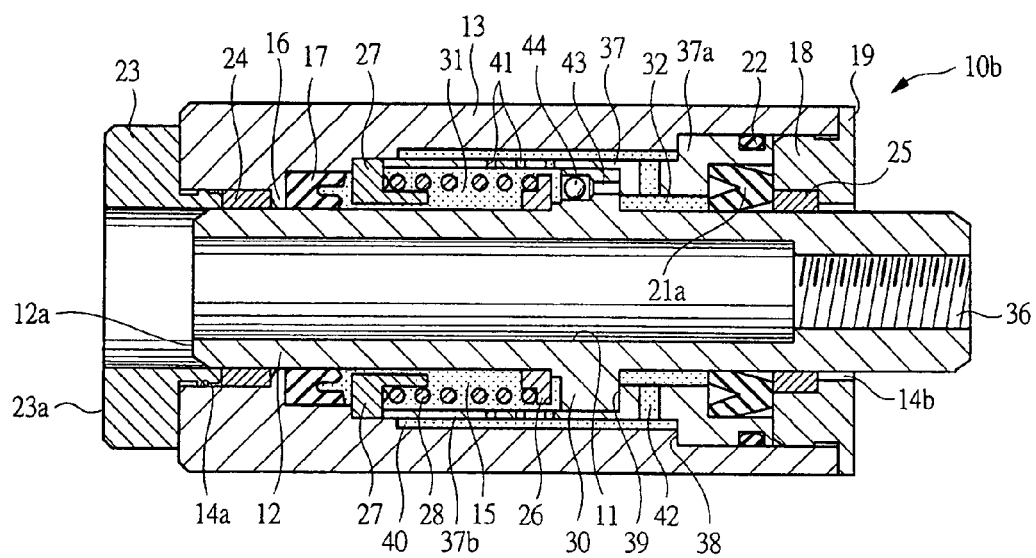
FIG. 4 is a sectional view showing a shock absorber according to another embodiment of the present invention.
Figure 5:
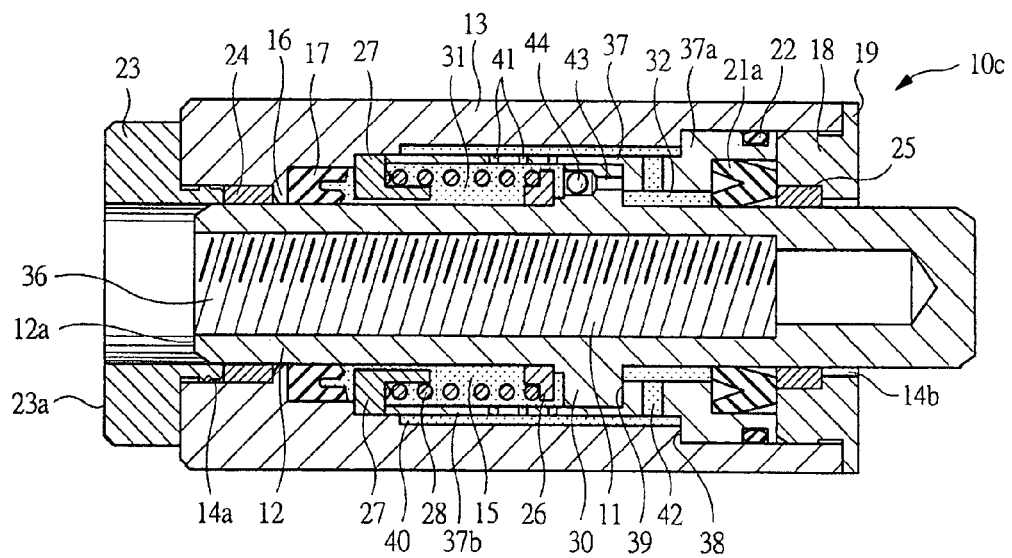
FIG. 5 is a sectional view showing a shock absorber according to still another embodiment of the present invention.
Figure 6:
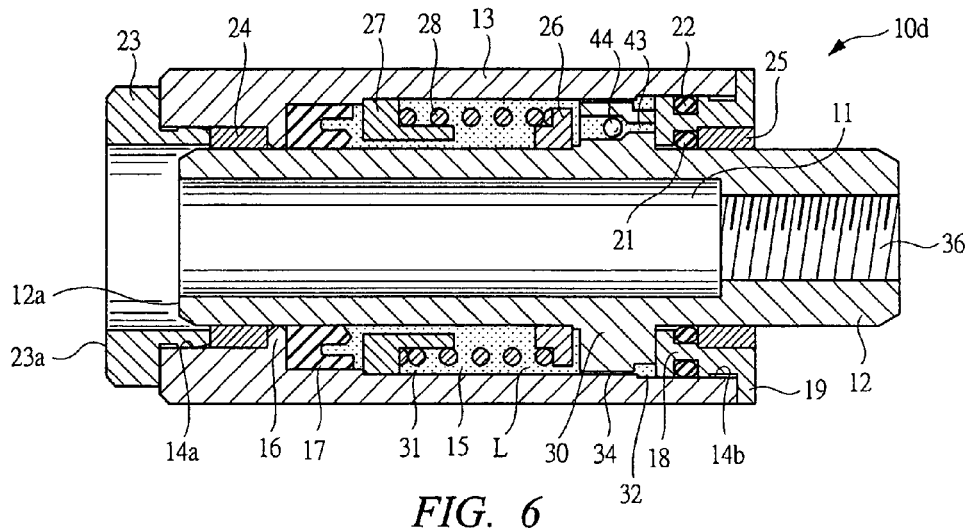
FIG. 6 is a sectional view showing a shock absorber according to yet still another embodiment of the present invention.
Figure 7:
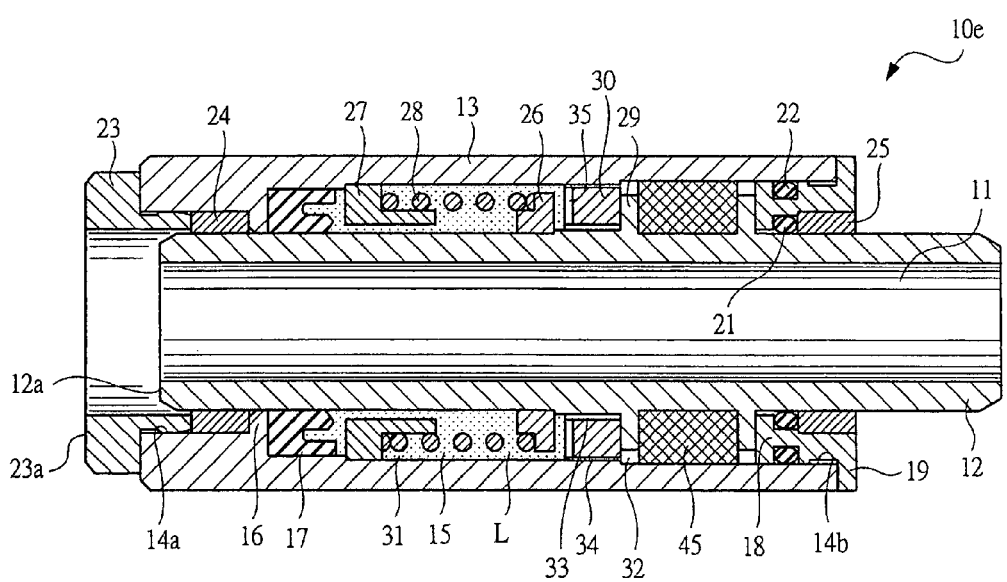
FIG. 7 is a sectional view showing a shock absorber according to yet still another embodiment of the present invention.

FIG. 4 is a sectional view showing a shock absorber 10b according to another embodiment of the present invention; FIG. 5 is a sectional view showing a shock absorber 10c according to still another embodiment of the present invention; FIG. 6 is a sectional view showing a shock absorber 10d according to yet still another embodiment of the present invention; and FIG. 7 is a sectional view showing a shock absorber 10e according to yet still another embodiment of the present invention. Basic structures of the shock absorbers 10b to 10e are the same as that as shown in FIGS. 1 and 2. In FIGS. 4 to 7, members having functions common to the members as shown in FIGS. 1 and 2 are denoted by the same reference numerals.

In the shock absorber 10b shown in FIG. 4, the annular piston 30 is provided integrally with the hollow rod 12, and an intermediate cylindrical body 37 is fixed inside the outer cylindrical body 13. This intermediate cylindrical body 37 has a cylindrical base portion 37a in which an abutting portion 38 abutting on a radial step formed on a side of the opening portion 14b of the outer cylindrical body 13 is formed and a stopper face 39 on which the annular piston 30 abuts is formed. A tubular guide portion 37b extending toward the opening portion 14a is provided integrally with the base portion 37a. The outer circumferential face of the annular piston 30 contacts with the inner circumferential face of the guide portion 37b, so that the annular piston 30 contacts with the inner circumferential face of the guide portion 37b and is guided by the guide portion and moved axially.

The intermediate cylindrical body 37 partitions the accommodating space 15 into a first and second liquid chambers 31 and 32 together with the annular piston 30 which contacts with the inner circumferential face of the intermediate cylindrical body 37, and a communicating gap 40 which communicates with the two liquid chambers 31 and 32 is formed between the intermediate cylindrical body 37 and the outer cylindrical body 13. A plurality of orifices 41 which communicate with the first liquid chamber 31 and the communicating gap 40 are formed in the guide portion 37b in the form of through holes in order to make the two liquid chambers 31 and 32, communicate with each other through the communicating gap 40. A plurality of communicating holes 42 which communicate with the second liquid chamber 32 and the communicating gap 40 are formed in the base portion 37b.

Thus, when the shock absorber is operated, that is, as the hollow rod 12 moves on a left side relatively to the outer cylindrical body 13 in FIG. 4, the number of the orifices 41 blocked by the annular piston 30 increases. Namely, the number of the orifices 41 which communicate with the first liquid chamber 31 and the second liquid chamber 32 through the communicating gap 40 decreases. Consequently, the entire areas of the orifices which communicate with the two liquid chambers 31 and 32 decrease gradually as the outer cylindrical body 13 moves toward the right end portion side of the hollow rod 12. That is, when the shock absorber 10b is operated, the resistance force is increased gradually as the outer cylindrical body 13 is moved relatively to the hollow rod 12. Incidentally, although the orifices 41 are formed by circular through holes, they may be formed by a single or plural slits extending axially.

In the annular piston 30, a guide hole 43 which communicates with the two liquid chambers 31 and 32 is formed. The guide hole 43 is provided with a check valve 44, which closes the guide hole 43 to prevent the flow of the liquid L from the first liquid chamber 31 to the second liquid chamber 32 when the outer cylindrical body 13 moves relatively to the right end portion side of the hollow rod 12 during an operation of the shock absorber. To the contrary, the check valve 44 opens the guide hole 43 to allow the flow of the liquid L from the second liquid chamber 32 to the first liquid chamber 31 when the outer cylindrical body 13 is moved relatively to the left end portion side of the hollow rod 12. Thus, the resistance force applied to a flow of the liquid from the first liquid chamber 31 to the second liquid chamber 32 when the hollow rod 12 absorbs the impact force and moves by an operation of the shock absorber 10b becomes larger than that applied to the flow of the liquid from the second liquid chamber 32 to the first liquid chamber 31 when the hollow rod 12 is restored to its original position. When the shock absorber 10b becomes in the inoperative condition, the hollow rod 12 and the outer cylindrical body 13 are immediately returned to their original positions by a force of the compression coil spring.

Incidentally, although the check valve 44 in FIG. 4 is formed of a spherical member, it may be formed of a needle-like member and the number of the guide holes 43 may be singular or plural. Further, the annular piston 30 of the shock absorber 10a shown in FIGS. 1 and 2 may be provided with the guide hole 43 and the check valve 44 in the same manner.

In the shock absorber 10c shown in FIG. 5, the attaching hole 11 formed in the hollow rod 12 is a bottomed hole and a female screw 36 is formed on the attaching hole 11. Thus, a tip portion of the reciprocating rod of a pneumatic cylinder or the like screwed to the hollow rod 12 of this shock absorber 10c without protruding from the hollow rod 12. Another structure of the shock absorber 10c is the same as that shown in FIG. 4.

In the shock absorber 10d shown in FIG. 6, the annular piston 30 is provided integrally outside the hollow rod 12 similarly to the shock absorbers 10b and 10c shown in FIGS. 4 and 5. The gap 34 is formed between the annular piston 30 and the outer cylindrical body 13 similarly to the shock absorber 10a shown in FIG. 1, and the guide hole 43 for communicating with the two liquid chambers 31 and 32 is formed in the annular piston 30. When the hollow rod 12 is moved relatively to the left end portion of the outer cylindrical body 13 during the operation of the shock absorber 10d, the guide hole 43 is closed to block a flow of the liquid L from the first liquid chamber 31 to the second liquid chamber 32. To the contrary, when the hollow rod 12 is moved relatively to the right end portion of the outer cylindrical body 13, the guide hole 43 is opened and a check valve 44 for permitting the flow of the liquid L from the second liquid chamber 32 to the first liquid chamber 31 is provided in the guide hole 43.

A basic structure of the shock absorber 10e shown in FIG. 7 is the same as that shown in FIGS. 1 and 2. The female screw 36 is not formed on the attaching hole 11 of the hollow rod 12, and the attaching hole 11 is formed by the through hole. Thus, to attach this shock absorber 10e to the reciprocating rod, the reciprocating rod is made to penetrate the attaching hole 11 of the hollow rod 12, and a nut is screwed to the tip portion of the reciprocating rod so that the shock absorber 10e is not detached from the reciprocating rod. As a result, the hollow rod 12 is never detached from the reciprocating rod even if the hollow rod 12 is fitted loosely to the reciprocating rod.

In the shock absorber 10e shown in FIG. 7, an accumulator 45 is incorporated in the second liquid chamber 32. The accumulator 45 contains a plurality of independent bubbles. Other structure of the shock absorber 10e is the same as that as show in FIG. 1.

Figure 8:
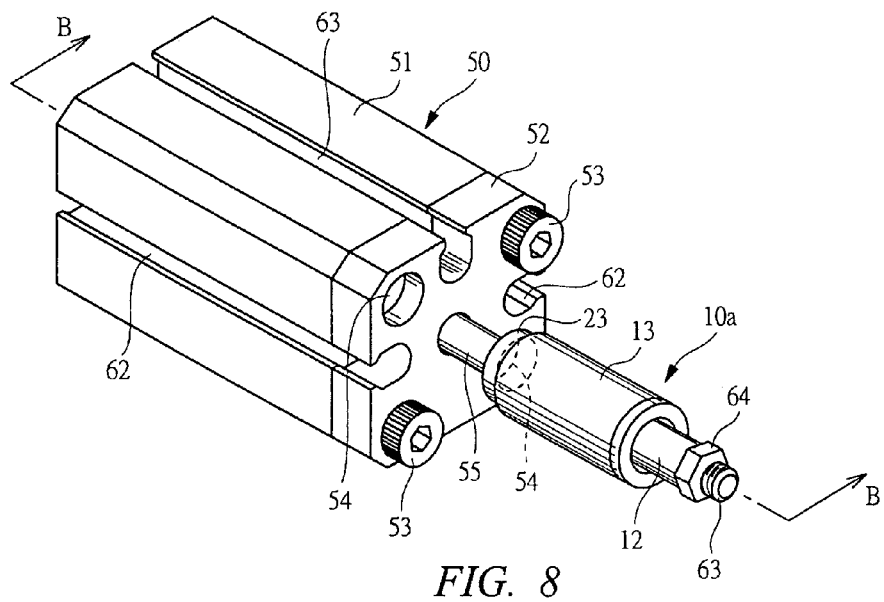
FIG. 8 is a perspective view showing a pneumatic cylinder as a reciprocating unit equipped with the shock absorber shown in FIGS. 1 and 2.
Figure 9:
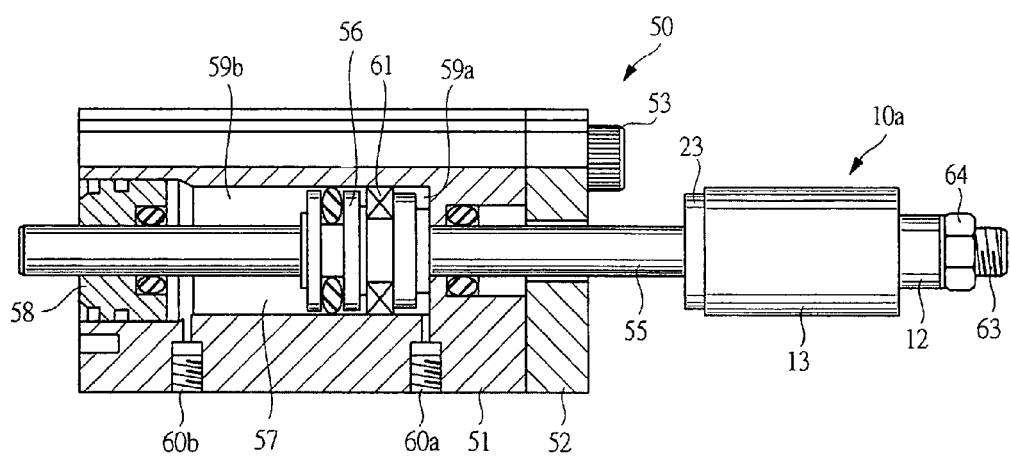
FIG. 9 is partially sectional view taken along line B-B in FIG. 8.

FIG. 8 is a perspective view showing a pneumatic cylinder 50 as a reciprocating unit on which the shock absorber 10a shown in FIGS. 1 and 2 is mounted. FIG. 9 is a partially sectional view taken along line B-B of FIG. 8.

This pneumatic cylinder 50 includes a cylinder main body comprising a cylinder tube 51 with square lateral section and an end plate 52 fixed to a tip face thereof, and a reciprocating unit main body is constituted by this cylinder main body. The end plate 52 is fixed to the cylinder tube 51 by screw members 53, and the cylinder main body is fixed to a supporting base etc. by a screw member (not shown) to penetrate through holes 54 formed in the cylinder tube 51 and the end plate 52.

A piston rod, i.e., the reciprocating rod 55 is provided axially reciprocably in the cylinder tube 51 so as to penetrate the cylinder tube 51 and the end plate 52, and a piston 56 fixed to the reciprocating rod 55 is reciprocable within a cylinder chamber 57 formed in the cylinder tube 51. The cylinder chamber 57 is blocked by a rod cover 58 fixed to a rear end portion of the cylinder tube 51, and the reciprocating rod 55 penetrates the rod cover 58 and protrudes backward from the cylinder tube 51. Assume that a rightward movement of the reciprocating rod 55 in FIG. 9 is a forward movement and a movement opposite thereto is a backward movement for convenience of a below-mentioned description. The cylinder chamber 57 is partitioned into two pressure chambers 59a and 59b by the piston 56, and supply/discharge ports 60a and 60b are formed in the cylinder tube 51 so as to communicate with the pressure chambers 59a and 59b, respectively. When compressed air is supplied to the supply/discharge port 60a, the reciprocating rod 55 is moved backward, and when the compressed air is supplied to the supply/discharge port 60b, the reciprocating rod 55 is moved forward.

Sensor attaching grooves 62 for attaching a magnetic sensor (not shown) which senses a magnetic force of a permanent magnet 61 provided to the piston 56 are formed, as shown in FIG. 8, in the cylinder tube 51 and the end plate 52 in order to automatically detect that the reciprocating rod 55 reaches a forward limit position or backward limit position. Three sensor attaching grooves 62 are provided in the case of the drawings, so that the sensor can automatically detect that the reciprocating rod 55 is moved up to the forward limit position or backward limit position by attaching the magnetic sensors to one or two sensor attaching grooves.

The shock absorber 10a shown in FIGS. 1 and 2 is mounted on a tip portion of the reciprocating rod 55 provided to the pneumatic cylinder 50 as a reciprocating unit. A male screw 63 is formed in the tip portion of the reciprocating rod 55, and the shock absorber 10a is attached to the tip portion of the reciprocating rod 55 by screwing the female screw 36 of the hollow rod 12 to the male screw 63 and then to a tightening nut 64. Thus, if a moving member (not shown) is connected to the tip portion of the reciprocating rod 55 and moved linearly, the tip portion of the reciprocating rod 55 protrudes significantly from the cylinder tube 51. At this time, when the reciprocating rod 55 is moved backward under the inoperative condition of the shock absorber 10a, the outer cylindrical body 13 collides with the end plate 52 of the cylinder main body through the projection end portion and the striker 23 as a colliding member, whereby the end face 12a of the hollow rod 12 contacts with the end plate 52 to stop the reciprocating rod 55. In this way, while the outer cylindrical body 13 is moved to the right end portion side of the end plate relatively to the hollow rod 12 in a time period from collision to stop, the impact force is decreased.

Incidentally, if the shock absorber 10a is attached to the rear end portion of the reciprocating rod 55 as well as the tip portion, the impact forces can be decreased when the reciprocating rod 55 is moved forward rightward and moved backward leftward in FIG. 8.

When the shock absorbers 10b and 10d shown in FIGS. 4 and 6 are attached to the reciprocating rod 55 shown in FIGS. 8 and 9, the male screw 63 of the reciprocating rod 55 is screwed to the female screw 36 of the hollow rod 12 and the fastening nut 64 is screwed to the male screw 63 in the same manner as described above. Meanwhile, if the shock absorber 10c shown in FIG. 5 is attached to the reciprocating rod 55, the male screw 63 of the reciprocating rod 55 is screwed to the female screw 36 in the attaching hole 11.

Further, when the shock absorber 10e shown in FIG. 7 is attached to the reciprocating rod 55 shown in FIGS. 8 and 9, the hollow rod 12 is fitted to the reciprocating rod 55 so as to make the tip of the reciprocating rod 55 protrude from the end portion of the hollow rod 12. Under this state, the nut is screwed to the male screw 63 and, consequently, the shock absorber 10e is attached to the reciprocating rod 55 so as not to be detached from the reciprocating rod 55.

Figure 10:
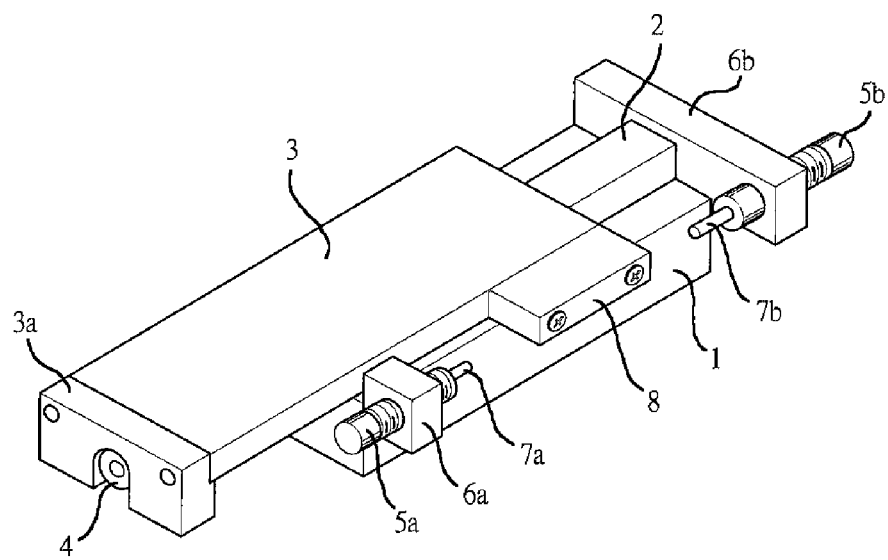
FIG. 10 is a perspective view showing a conventional pneumatic cylinder including a cylinder main body and a reciprocating table which is reciprocably mounted on a guide rail provided to the cylinder main body.

The reciprocating unit shown in FIGS. 8 and 9 is a pneumatic cylinder 50 comprising the cylinder tube 51 and the reciprocating rod 55. The reciprocating unit capable of attaching the shock absorber is not limited to this example. As shown in FIG. 10, this shock absorber may be attached to a slide table type pneumatic cylinder, which has the cylinder main body and a slide table, i.e., a reciprocating table mounted axially reciprocably along the cylinder main body, wherein the reciprocating table is driven by the reciprocating rod through the linking member. The shock absorber 10e provided with no female screw in the attaching hole 11 as shown in FIG. 7 can be attached to the slide table type pneumatic cylinder by fitting the reciprocating rod to the attaching hole 11. In that case, the impact force of the reciprocating table can be decreased by making a projecting end of the hollow rod 12 abut on one of the cylinder main body and the linking member, e.g., the cylinder main body and by making the striker 23 abut on the other of the cylinder main body and the linking member, e.g., the linking member.

Thus, in the shock absorber of the present invention, the hollow rod 12 and the outer cylindrical body 13 mounted outside it are movable axially relatively, so that the hollow rod 12 may be fixed to the reciprocating rod 55 which penetrates the attaching hole 11 of the hollow rod 12 as shown in FIGS. 8 and 9. Further, when the shock absorber is attached to the slide table type pneumatic cylinder, the reciprocating rod may be fitted to the attaching hole 11 without fixing the hollow rod 12 to the reciprocating rod.

In the above-described shock absorbers 10a to 10e, the reciprocating rod, which is a source for generating an impact force, is attached to the attaching hole 11 of the hollow rod 12 so as to make the colliding member collide with the outer cylindrical body 13 coaxial with the hollow rod 12. Therefore, when the shock absorber is operated, no load in a direction of inclining the reciprocating rod is applied to the pneumatic cylinder as a reciprocating unit and no bending moment is applied to the reciprocating rod. Consequently, durability of the reciprocating unit can be improved. Additionally, it is unnecessary to provide any fixing jig for attaching the shock absorber or any stopper with respect to the reciprocating unit, so that it is not required to secure any space for disposing the fixing jig and the like around the reciprocating unit, and it is possible to reduce the manufacture cost of the reciprocating unit.

The present invention is not limited to the above-described embodiments, and may be variously modified and varied within a range not departing from the gist of the invention. For example, FIGS. 8 and 9 show a pneumatic cylinder to which the shock absorber is attached. However, the shock absorber of the present invention can be applied to not only a pneumatic cylinder but also a hydraulic cylinder which uses hydraulic pressure as a drive medium as long as it has a unit, a rod of which can be reciprocated.

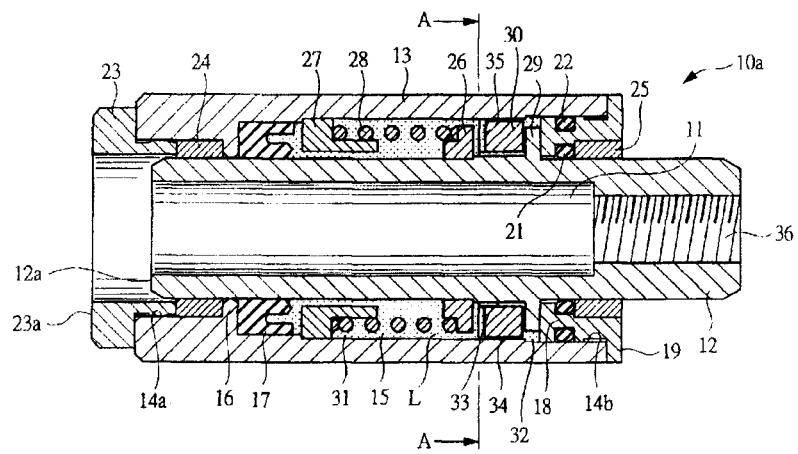

What is claimed is:

1. A shock absorber decreasing an impact force of a reciprocating rod provided in a reciprocating unit at a time of stopping the reciprocating rod, the shock absorber comprising:
- a hollow rod having an attaching hole formed therein and being attached coaxially with the reciprocating rod;
- an outer cylindrical body mounted outside the hollow rod and axially movable relatively to and coaxially with the hollow rod, a liquid accommodating space being formed between circumferential surfaces of the outer cylindrical body and the hollow rod, and separated from the attaching hole;
- an annular piston provided outside the hollow rod so as to be slidable axially along the hollow rod, partitioning the liquid accommodating space into a first liquid chamber and a second liquid chamber each separated from the attaching hole, and applying a resistance force to a flow of the liquid from the first liquid chamber to the second liquid chamber at a time of an impact-force absorption movement of the hollow rod to the outer cylindrical body;
- a restoring means provided in the first liquid chamber and returning the hollow rod to an original position located before an impact-force absorption;
- an outside gap formed between an outer circumferential face of the annular piston and an inner circumferential face of the outer cylindrical body, and applying a resistance force to the flow of the liquid from the first liquid chamber to the second liquid chamber; and
- an inside gap formed between an inner circumferential face of the annular piston and an outer circumferential face of the hollow rod, and guiding the liquid from the second liquid chamber to the first liquid chamber together with the outside gap.

2. The shock absorber according to claim 1, wherein the inside gap is larger in size than the outside gap.

3. The shock absorber according to claim 1, wherein a female screw to be screwed to a male screw formed in the reciprocating rod is formed in the attaching hole.

4. The shock absorber according to claim 1, further comprising:
- a striker mounted on a colliding end portion of the outer cylindrical body so as to abut on a reciprocating unit main body driving the reciprocating rod.

5. The shock absorber according to claim 2, wherein a female screw to be screwed to a male screw formed in the reciprocating rod is formed in the attaching hole.

6. The shock absorber according to claim 2, further comprising:
- a striker mounted on a colliding end portion of the outer cylindrical body so as to abut on a reciprocating unit main body driving by the reciprocating rod.

7. The shock absorber according to claim 2, further comprising:
- an accumulator incorporated in the second liquid chamber to absorb the liquid.

8. The shock absorber according to claim 1, wherein the annular piston has an end surface facing the first liquid chamber and provided with a plurality of slits, which guide the liquid from the inside gap to the first liquid chamber while the hollow rod is restored to the original position.

* * * * *

UNITED STATES PATENT AND TRADEMARK OFFICE
CERTIFICATE OF CORRECTION

| | | |
|---|---|---|
| PATENT NO. | : 8,181,756 B2 | Page 1 of 1 |
| APPLICATION NO. | : 11/712663 | |
| DATED | : May 22, 2012 | |
| INVENTOR(S) | : Akiyoshi Horikawa and Yuta Ohmura | |

It is certified that error appears in the above-identified patent and that said Letters Patent is hereby corrected as shown below:

Col. 14, Claim 9 should be added as follows:

9.   The shock absorber according to claim 1, further comprising:
an accumulator incorporated in the second liquid chamber to absorb the liquid.

Signed and Sealed this
Twenty-seventh Day of November, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,181,756 B2 | |
| APPLICATION NO. | : 11/712663 | |
| DATED | : May 22, 2012 | |
| INVENTOR(S) | : Akiyoshi Horikawa and Yuta Ohmura | |

It is certified that error appears in the above-identified patent and that said Letters Patent is hereby corrected as shown below:

Delete the title page and substitute therefore the attached title page showing the corrected number of claims in patent.

Col. 14, line 31, Claim 9 should be added as follows:

9. The shock absorber according to claim 1, further comprising:
an accumulator incorporated in the second liquid chamber to absorb the liquid.

This certificate supersedes the Certificate of Correction issued November 27, 2012.

Signed and Sealed this
First Day of January, 2013

David J. Kappos
*Director of the United States Patent and Trademark Office*

(12) United States Patent
Horikawa et al.

(10) Patent No.: US 8,181,756 B2
(45) Date of Patent: May 22, 2012

(54) SHOCK ABSORBER

(75) Inventors: Akiyoshi Horikawa, Tokyo (JP); Yuta Ohmura, Tokyo (JP)

(73) Assignee: Koganei Corporation, Tokyo (JP)

( * ) Notice: Subject to any disclaimer, the term of this patent is extended or adjusted under 35 U.S.C. 154(b) by 1259 days.

(21) Appl. No.: 11/712,663

(22) Filed: Mar. 1, 2007

(65) Prior Publication Data

US 2007/0205064 A1    Sep. 6, 2007

(30) Foreign Application Priority Data

Mar. 2, 2006   (JP) .................................. 2006-056030
Feb. 26, 2007  (JP) .................................. 2007-045771

(51) Int. Cl.
*F16F 9/18* (2006.01)
(52) U.S. Cl. .................. 188/312; 188/316; 188/281
(58) Field of Classification Search .............. 188/316, 188/281, 312; 267/226
See application file for complete search history.

(56) References Cited

U.S. PATENT DOCUMENTS

| | | | |
|---|---|---|---|
| 2,905,458 A | 9/1959 | Mason | |
| 2,948,358 A | 8/1960 | Born et al. | |
| 3,889,934 A | 6/1975 | Kamman | |
| 4,133,086 A | 1/1979 | Brennan | |
| 4,711,463 A | 12/1987 | Knable et al. | |
| 5,159,997 A * | 11/1992 | Heideman et al. | 188/282.1 |
| 5,228,640 A | 7/1993 | Mouille | |
| 5,309,817 A | 5/1994 | Sims | |
| 5,711,514 A | 1/1998 | Lu | |
| 5,749,596 A * | 5/1998 | Jensen et al. | 280/124.166 |
| 5,904,099 A * | 5/1999 | Danneker | 104/53 |
| 5,927,448 A * | 7/1999 | Yamazaki | 188/281 |
| 6,260,832 B1 | 7/2001 | Vignocchi et al. | |
| 6,315,093 B1 | 11/2001 | Miura et al. | |
| 6,722,678 B2 | 4/2004 | McAndrews | |
| 7,076,834 B2 * | 7/2006 | Li | 16/85 |
| 7,410,154 B2 * | 8/2008 | Lam et al. | 267/226 |

FOREIGN PATENT DOCUMENTS

EP    1 118 775 A2    7/2001
(Continued)

OTHER PUBLICATIONS

Korean Office Action dated Jan. 10, 2008.
(Continued)

*Primary Examiner* — Bradley King
(74) *Attorney, Agent, or Firm* — McCormick, Paulding & Huber LLP

(57) ABSTRACT

A shock absorber is attached coaxially with a reciprocating rod driven by a reciprocating unit to prevent a bending moment from being applied to the reciprocating rod in absorbing an impact force. The shock absorber has a hollow rod and an outer cylindrical body mounted axially movably relatively to and outside the hollow rod. An accommodating space is formed between the hollow rod and the outer cylindrical body. A spring force in a direction of being relatively directed to one end portion side of the hollow rod is applied by a compression spring to the outer cylindrical body. The hollow rod is provided with an annular piston which partitions the accommodating space into two liquid chambers. When an impact force in a direction of being relatively directed to the other end side of the hollow rod is applied to the outer cylindrical body, liquid flows from one of the liquid chambers to the other through a gap, so that a resistance force is applied to the annular piston.

9 Claims, 5 Drawing Sheets